W. L. OSBORNE.
VALVE.
APPLICATION FILED OCT. 18, 1911.
1,070,720.
Patented Aug. 19, 1913.
2 SHEETS—SHEET 2.
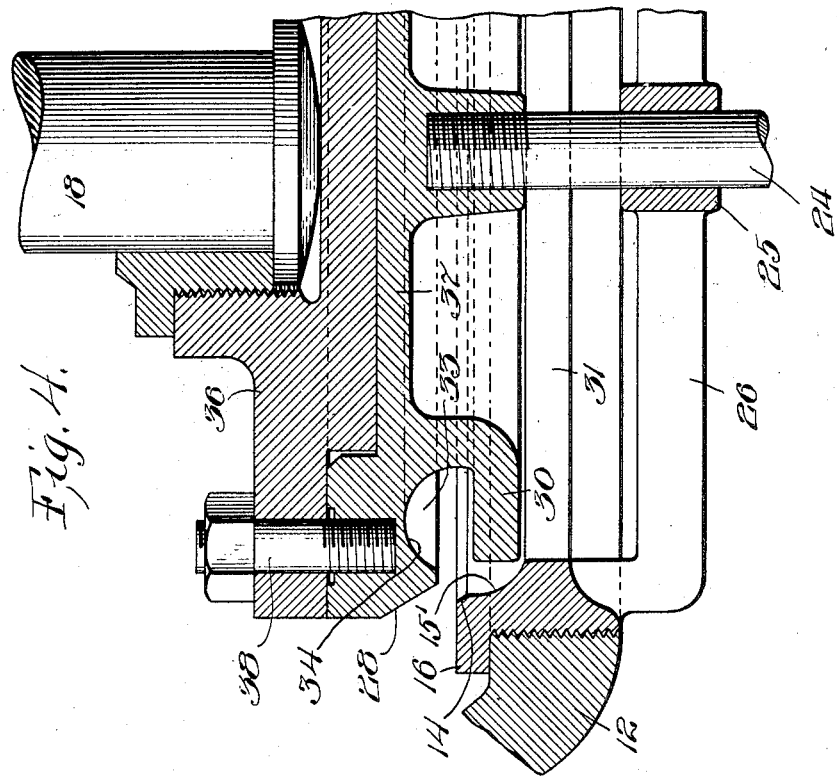
Witnesses:
Harry S. Gaither
J. H. Burgess
Inventor:
William L. Osborne
by William L. Hall,
Att'y

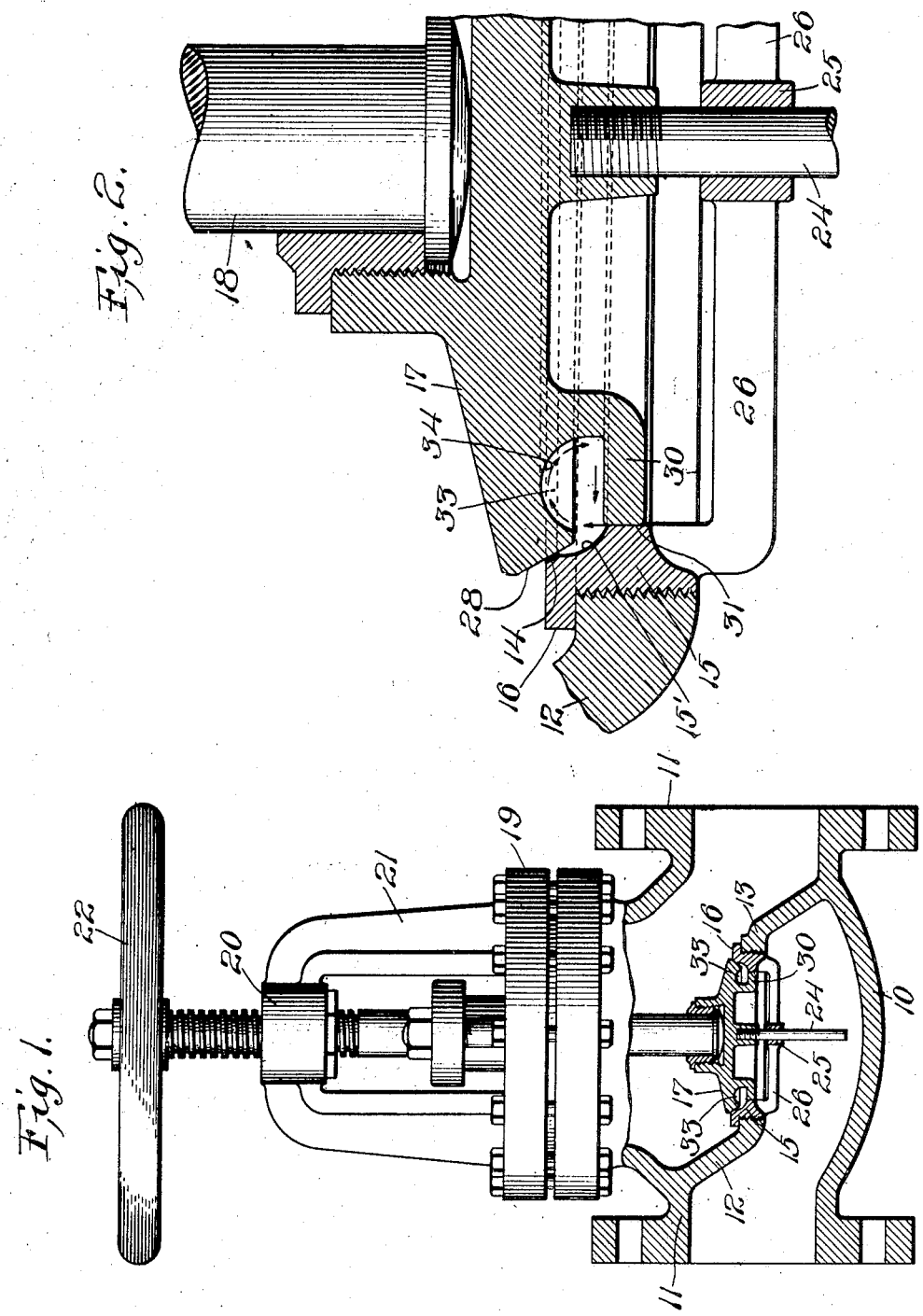

UNITED STATES PATENT OFFICE.

WILLIAM LLOYD OSBORNE, OF CHICAGO, ILLINOIS.

VALVE.

1,070,720.  Specification of Letters Patent.  Patented Aug. 19, 1913.

Application filed October 18, 1911. Serial No. 655,381.

*To all whom it may concern:*

Be it known that I, WILLIAM L. OSBORNE, a citizen of the United States, and a resident of Chicago, in the county of Cook and State of Illinois, have invented certain new and useful Improvements in Valves; and I do hereby declare that the following is a full, clear, and exact description thereof, reference being had to the accompanying drawings, and to the characters of reference marked thereon, which form a part of this specification.

This invention relates to improvements in valves, and refers more specifically to improvements designed to protect the valve and body seats from the wearing action of high pressure fluids passing through the valves.

The invention consists in the matters hereinafter set forth and more particularly pointed out in the appended claims.

Figure 1 is a view partially in side elevation and partially in axial section of a valve embodying my invention. Fig. 2 is an enlarged fragmentary section of the parts which carry the valve and body seats, respectively, showing the valve partly open. Fig. 3 is a similar view showing the valve fully open. Fig. 4 is a view similar to Fig. 3, showing a modification of the valve piece.

My improvements are herein shown as applied to a globe valve of common form, but may be applied to other forms of valves having a closure generally similar to that herein shown. The valve body 10 is provided with flanged branches 11, 11 and between said branches a diaphragm 12 having a horizontally apertured portion 13 which carries the usual annular body seat. The body seat 14 is herein shown as formed on a screw-threaded ring 15 which is exteriorly screw-threaded to engage the screw-threads of the apertured diaphragm, and said ring is provided with a flange 16 which fits over the horizontal portion of the diaphragm outside the aperture therein to limit its movement into said aperture. The seat herein shown is conical and is formed on the upper, inner surface of the ring.

The valve piece 17 has a swiveling connection with the screw-threaded stem 18 in a well known manner which latter extends outwardly through the bonnet 19 of the valve casing and is screw-threaded to engage the screw-threaded nut or portion 20 carried by the arms 21 of said bonnet. The stem is provided at its outer end with a hand wheel 22 by which it is turned to raise the valve piece from and lower it toward the body seat.

The valve piece may be provided with a guide stem 24 which extends downwardly from an axial screw-threaded socket on the under side of the valve piece to engage a bearing 25 carried by the spider arms 26, 26 which, as herein shown, are made integral with the body seat ring 15. The valve seat 28 which is formed on or carried by the valve piece to coöperate with the body seat is herein shown as made conical to correspond with the angle of the body seat. The said valve piece is provided on its lower side with a cylindric projection 30 which is adapted to extend into and closely fit and fill a restricted portion 31 of the opening in the body seat opening, the clearance between the periphery of said projection and the restricted opening being such as to substantially but not wholly cut off the flow of the fluid through the space around the projection at a time when the projection is contained wholly or partially within the valve opening. The projection 30 extends such a distance beyond the valve seat 28 as to enter said restricted portion 31 of the valve opening and to cut off or throttle the flow of the fluid through the valve at a time when the valve seat is spaced a substantial distance away from the body seat, in the closing movement of the valve, as indicated in Figs. 3 and 4, and to leave such restricted opening only after the valve seat has been lifted a substantial distance away from the body seat.

The valve piece is provided radially within the valve seat 28, and between the valve seat, and said projection, with an annular pressure reducing chamber 33 of substantial dimensions. The upper wall 34 of said chamber is transversely concave, and the outer side of the curved wall of said chamber is disposed a distance radially outside the circular periphery of the projection 30. The projection 30 is not intended to constitute the seating or closing portion of the valve, but is provided to protect the valve and body seats from the wire drawing action of the fluid passing through the valve when the valve is slightly open, that is to say, when the valve seat is removed but a slight distance from its seat, either in the opening or the closing movement of the valve. The body seat ring 15 is formed between the body seat and the restricted portion of the valve opening with a transversely curved, upwardly flaring portion 15' which serves to enlarge the pressure reducing chamber 33 and to properly divert the fluid to the space between the separated valve and body seats. Said flaring portion also assists to guide the projection into the restricted portion of the valve opening. The operation of said projection, in combination with the chamber 33 thereabove to effect the foregoing results will be understood from an examination of Fig. 2. Said Fig. 2 show the valve seat in a position but a slight distance from the body seat, such as occurs both in the opening and the closing movements of the valve. If the projection 30 were not present, the high velocity of the fluid passing from one side of the valve to the other through the restricted annular opening between the seats would have the effect to rapidly wear away or distort said seats, and thereby quickly impair the efficiency of the valve. With the projection 30 present however, and assuming that the flow of fluid is upwardly through the valve, in the position of the valve shown in Fig. 2, the annular jet of fluid issuing from the space between the projection and the restricted opening of the valve, strikes the outer side of the upper concave wall of the chamber 33, and the effect of the curvature of the wall is to throw or divert the jet inwardly or away from the valve and body seats, as indicated by the arrows in Fig. 2, the fluid being turned inwardly by the curvature of the wall and again directed outwardly through said annular jet and thence to the space between the separated valve and body seats. This diverting action of the fluid, in connection with the relatively large area of the chamber 33, as compared to the area between the valve and body seats and between the projection 30 and the restricted valve opening, has the effect to slow down the speed of the fluid before it passes through the space between the valve and the body seats, so that the jet of fluid which issues through the partly opened valve has little or no effect to wear the seating faces of the valve. So long therefore, as the projection 30 remains within the restricted opening of the valve passage, no direct wear of the high speed jet can be impressed upon the valve and body seats, so that said seats are at this time protected, with the result of greatly lengthening the life of the valve.

The angles of the valve and body seats are so disposed that when the valve is in its full opened position, as shown in Fig. 3, the faces of said seats are substantially parallel with the direction of flow of the active or cutting zone of the fluid issuing through the valve, so that, also, when the valve is open, with the projection 30 withdrawn from the restricted part of the valve opening, the seating faces of the valve and body seats receive little or no wear due to the passage of fluid over or across the same. The angle of the valve and body seats which I have found to contribute very efficiently toward this result is sixty degrees from the diametric plane.

In the construction shown in Figs. 1, 2 and 3, the valve piece 17 is shown as made of a single or integral part, and will usually be made of brass or like material.

In Fig. 4, I have shown a construction of valve, designed more particularly for the larger sizes, in which the valve piece consists of a cast iron body or backing 36 and the brass facing 37 which is attached to the cast iron body, in any suitable manner, as by means of the screw-threaded studs 38. The said facing 37 is formed to provide the valve seat 28 and the projection 30 before referred to. The arrangement of the facing 37 permits the valve piece to be materially cheapened in its cost of construction, the brass or other material being only sufficiently massive on which to form the valve seat and projection, while the cast iron body 36 constitutes the backing of the relatively weaker metal of the facing. The facing 37 extends entirely across the backing or body 36 on the under side of the valve piece, so as to preclude the passage of fluid from one side of the valve to the other except between the valve seats, and is provided on the under side with a hollow screw-threaded nipple to receive the guide stem 34. The said facing is provided at its margin with an upstanding annular rib to fit in an annular recess at the margin of the backing. Said parts are not fitted closely upon each other, as indicated in Fig. 4, in order to provide for the differential expansion of the materials, and also to permit the valve piece formed by the two parts to flex or spring, for a purpose hereinafter described. A further advantage of chambering the valve piece to produce the pressure reducing chamber 33, when used in a piping system for hot fluids, is that the valve piece is thereby slightly weakened between its marginal portion and its center, so as to permit the central portion of said valve piece to slightly flex or yield downwardly when the valve piece is forced tightly against the body seat. When the valve stem, which is in contact with the hot fluid, cools, after the valve is closed, and is therefore contracted or shortened, the valve piece or disk resumes its normal shape and the shortening of the valve stem is compensated by the return of the central portion of the valve stem to its normal plane. Therefore, the contraction of the valve stem when cooling does not have the effect to pull the valve piece away from the body seat, such as would occur if the valve piece be rigid or non-yielding between its central and marginal portions.

The construction shown is capable of some variations within the scope of the invention, and the invention is not limited to the specific details illustrated except as hereinafter made the subject of specific claims.

I claim as my invention:—

1. A valve having an opening surrounded by an inwardly facing conical body seat, a movable valve piece having an outwardly facing conical seat to engage the body seat, and a cylindric projection on the valve piece adapted to enter and closely fit and substantially fill a cylindric portion of the opening of the valve beyond the body seat, and adapted to enter said opening before the valve is seated and to leave the opening only after the seats are separated a substantial distance in the opening of the valve, there being formed in the valve piece between said projection and valve seat an annular chamber, which is shaped to divert a jet of fluid that is directed into said chamber from the space surrounding said projection, when the valve is partly open, away from the valve seats and thence direct the diverted jet toward the space between the separated seats.

2. A valve having an opening surrounded by an annular conical body seat, a movable valve piece having a conical seat to engage the body seat, and a cylindric projection on the valve piece adapted to enter and closely fit and substantially fill a cylindric restricted part of the opening of the valve beyond the body seat, and of a length to occupy said restricted portion of the opening in advance of the seating movement of the valve and to remain in said opening after the seats have substantially separated, said conical seats being substantially parallel to the path of the active or cutting zone of the fluid flowing between the seat faces of the open valve.

3. A valve having an opening surrounded by a conical body seat, a movable valve piece having a conical seat to engage the body seat, and a cylindric projection on the valve piece in advance of the valve seat adapted to enter and closely fit and substantially fill a cylindric portion of the valve opening beyond the body seat, there being formed in the valve piece between the valve seat and the projection an annular chamber, the upper wall of which is transversely concave, and the outer part of said concave wall extending radially outside the periphery of said projection, said conical seats being substantially parallel to the path of the active or cutting zone of the fluid flowing between the seat faces of the open valve.

4. A valve comprising an annular conical seat, a movable valve piece having a conical seat to engage the body seat, a cylindric projection on the valve piece in advance of the valve seat adapted to enter and closely fit and substantially fill a cylindric portion of the valve opening beyond the body seat, there being formed in the valve piece between the valve seat and the projection an annular chamber, the upper wall of which is transversely concave and the upper part of said concave wall extending radially outside the periphery of said projection, the member on which said body seat is formed having exterior to the periphery of said projection an annular transversely concave portion for the purpose set forth.

5. A valve having an opening, a ring screw-threaded in said opening and formed on its upper inner corner to provide a conical body seat and beyond said seat with a restricted portion and between said seat and said restricted portion with an annular concave portion, and a movable valve piece provided with a seat to engage the body seat, and having a projection adapted to enter said restricted opening of the ring in advance of the seating of the valve piece and substantially filling said opening, and an annular chamber in the valve piece between the seat thereof, and said projection, substantially as described.

6. A valve comprising a body having an opening surrounded by a body seat, a movable valve piece having a seat to engage said body seat, a stem centrally engaging said valve piece for moving it toward and from the body seat, the valve piece being weakened between its center and periphery to permit the central portion of the valve to flex when forced down on the body seat, and a cylindric projection on the valve piece adapted to enter and substantially fill a like shaped portion of the valve opening beyond the body seat.

7. A valve comprising a body having an opening surrounded by an annular seat and a movable valve piece having a seat to engage the body seat, said valve piece comprising a cast iron body or backing, with an actuating stem connected thereto, and a facing extending entirely across the body or backing and formed to provide at its periphery the valve seat and also a projection beyond the valve seat adapted to enter and closely fit and substantially fill a restricted part of the valve opening beyond the body seat when the body and the valve seats are separated a substantial distance.

8. A valve comprising a body having an opening, surrounded by a body seat, and a movable valve piece having a seat to engage said body seat, said valve piece comprising a cast iron body, with an actuating stem connected thereto, and a facing extending entirely across said body or backing, said facing being formed to provided a valve seat and also a projection beyond the valve seat adapted to enter and substantially fill a restricted part of the valve opening beyond the body seat, and the facing being also formed at its periphery with a thickened annular flange or rib which is fitted in a recess in the backing, with means engaging said thickened part to fasten the facing to the backing.

In testimony, that I claim the foregoing as my invention I affix my signature in the presence of two witnesses, this 21st day of September A. D. 1911.

WILLIAM LLOYD OSBORNE.

Witnesses:
WILLIAM L. HALL,
GERTRUDE E. DOWLE.